United States Patent

Hockemeyer et al.

Patent Number: 5,134,203
Date of Patent: Jul. 28, 1992

[54] CROSSLINKABLE COMPOSITIONS AND THEIR USE IN THE PRODUCTION OF COATINGS WHICH REPEL STICKY SUBSTANCES

[75] Inventors: Friedrich Hockemeyer, Lärchenstr; Christian Herzig, Schro kenbauer, both of Fed. Rep. of Germany

[73] Assignee: Wacker-Chemie GmbH, Munich, Fed. Rep. of Germany

[21] Appl. No.: 691,912

[22] Filed: Apr. 26, 1991

[30] Foreign Application Priority Data

Apr. 26, 1990 [DE] Fed. Rep. of Germany ....... 4013280

[51] Int. Cl.$^5$ .............................. C08G 77/20
[52] U.S. Cl. .................... 525/478; 525/479; 528/15; 528/31; 528/32; 528/30
[58] Field of Search ............... 528/15, 31, 32, 30; 525/478, 479

[56] References Cited

U.S. PATENT DOCUMENTS

| | | | |
|---|---|---|---|
| 3,313,773 | 4/1967 | Lamoreaux et al. | 528/31 |
| 3,882,083 | 5/1975 | Berger et al. | 528/31 |
| 4,617,238 | 10/1986 | Crivello et al. | 528/31 |
| 4,721,764 | 1/1988 | Fujiki et al. | 528/15 |

Primary Examiner—Melvyn I. Marquis
Assistant Examiner—Margaret W. Glass

[57] ABSTRACT

Crosslinkable compositions containing (1) An organopolysiloxane having alkenyloxy functional groups and containing Si-bonded radicals Y of the formula $$-(CH_2)_2-R^1-(A-R^2)_z-O-R^3-CH=CH_2,$$

in which
A represents $-O-$, $-S-$ or

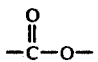

group,
$R^1$ represents a straight-chain or branched alkylene radical having from 1 to 7 carbon atoms per radical of a cycloalkylene radical having from 5 to 7 carbon atoms per radical,
$R^2$ represents a straight-chain or branched alkylene radical having from 2 to 4 carbon atoms per radical, which can be substituted by a hydroxyl group, methoxy group, ethoxy group or trimethylsiloxy group,
$R^3$ represents a straight-chain or branched alkylene radical having from 1 to 7 carbon atoms per radical, and z is 0, 1 or 2,
(2) an organopolysiloxane containing Si-bonded hydrogen atoms, and
(3) a catalyst which promotes the addition of Si-bonded hydrogen to an aliphatic double bond.

10 Claims, No Drawings

CROSSLINKABLE COMPOSITIONS AND THEIR USE IN THE PRODUCTION OF COATINGS WHICH REPEL STICKY SUBSTANCES

The present invention relates to crosslinkable compositions and more particularly to crosslinkable organopolysiloxane compositions which may be used as coatings to repel sticky substances.

BACKGROUND OF THE INVENTION

Crosslinkable compositions based on (1) an organopolysiloxane containing Si-bonded vinyl groups, (2) an organopolysiloxane containing Si-bonded hydrogen atoms, and (3) a catalyst which promotes the addition of Si-bonded hydrogen to an aliphatic double bond are disclosed in U.S. Pat. No. 3,445,420, (published May 20, 1969, G. J. Kookootsedes et al., Dow Corning Corp.) and GB-A 1,374,792, (published Nov. 20, 1974, J. A. Colquhoun et al., Dow Corning Ltd.).

U.S. Pat. No. 4,347,346 (published Aug. 31, 1982, R. P. Eckberg, General Electric Co.), U.S. Pat. No. 4,476,166 (published Oct. 9, 1984, R. P. Eckberg, General Electric Co.) and U.S. Pat. No. 4,504,645 (published Mar. 12, 1985, K. C. Melancon, Minnesota Mining and Manufacturing Co.) disclose that organopolysiloxanes containing alkenyl groups other than Si-bonded vinyl groups, such as Si-bonded allyl groups, can be employed as constituent (1) in crosslinkable coating compositions based on the constituents (1) to (3) above.

U.S. Pat. No. 4,609,574 (published Sept. 2, 1986, J. R. Keryk et al., Dow Corning Corp.) discloses that crosslinkable coating compositions based on (1) organopolysiloxanes containing higher alkenyl groups, such as Si-bonded hexenyl groups, and the constituents (2) and (3) described above, cure rapidly.

Therefore it is an object of the present invention to provide novel compositions containing organopolysiloxanes which crosslink by addition of Si-bonded hydrogen to aliphatic double bonds in the presence of catalysts. Another object of the present invention is to provide novel compositions which may be used as coatings which repel sticky substances. Another object of the present invention is to provide compositions which crosslink rapidly at low temperatures, such as room temperature. A further object of the present invention is to provide compositions which yield tack-free and migration-free coatings, so that the adhesive power of the adhesives with which the coatings come into contact are not impaired. A still further object of the present invention is to provide compositions which yield abrasion-resistant coatings.

SUMMARY OF THE INVENTION

The foregoing objects and others which will become apparent from the following description are accomplished in accordance with this invention, generally speaking, by providing crosslinkable compositions containing (1) An organopolysiloxane having alkenyloxy functional groups and containing Si-bonded radicals Y of the formula $$-(CH_2)_2-R^1-(A-R^2)_z-O-R^3-CH=CH_2, \quad (I)$$

in which A represents $-O-$, $-S-$ or

group, $R^1$ represents a straight-chain or branched alkylene radical having 1 to 7 carbon atoms per radical or a cycloalkylene radical having from 5 to 7 carbon atoms per radical, $R^2$ represents a straight-chain or branched alkylene radical having from 2 to 4 carbon atoms per radical, which can be substituted by a hydroxyl group, methoxy group, ethoxy group or trimethylsiloxy group, $R^3$ represents a straight-chain or branched alkylene radical having from 1 to 7 carbon atoms per radical, and z is 0, 1 or 2, (2) an organopolysiloxane containing Si-bonded hydrogen atoms, and (3) a catalyst which promotes the addition of Si-bonded hydrogen to an aliphatic double bond.

The invention further relates to a process for preparing coatings which repel sticky substances, by applying compositions which contain (1) an organopolysiloxane having alkenyloxy functional groups and containing Si-bonded radicals Y of the formula $$-(CH_2)_2-R^1-(A-R^2)_z-O-R^3-CH=CH_2, \quad (I)$$

in which $R^1$, $R^2$, $R^3$, A and z are the same as above, (2) an organopolysiloxane containing Si-bonded hydrogen atoms, and (3) a catalyst which promotes the addition of Si-bonded hydrogen to an aliphatic double bond to the surfaces which are to be rendered repellent to sticky substances and subsequent curing the composition.

DESCRIPTION OF THE INVENTION

The organopolysiloxanes (1) having alkenyloxy functional groups preferably contain at least 2 Si-bonded Y radicals.

Preferably, the organopolysiloxanes (1) having alkenyloxy functional groups which are used are those of the general formula $$Y_cR_{3-c}SiO(SiR_2O)_n(SiRYO)_mSiR_{3-c}Y_c \quad (II)$$

in which Y is the same as above, R, which may be the same or different, represents a monovalent hydrocarbon radical having from 1 to 18 carbon atoms per radical or a monovalent substituted hydrocarbon radical having from 1 to 18 carbon atoms per radical, c is 0 or 1, preferably 1, n is 0 or an integer of from 1 to 5,000 and m is 0 or an integer of from 1 to 150, with the proviso that the organopolysiloxanes contain, on an average, at least 1.5 Si-bonded Y radicals.

In addition to the diorganopolysiloxane units SiR$_2$O, other siloxane units may be present within or along the organopoly-siloxane chain of the formula indicated above, which generally are not shown in formulas of this type. Examples of such siloxane units, which, however, are usually present only as impurities, are those of the formulas RSiO$_{3/2}$, R$_3$SiO$_{\frac{1}{2}}$ and SiO$_{4/2}$, in which R has the same meaning as above. The amount of such other siloxane units is preferably at most 10 mol % and more preferably at most 1 mol %.

Examples of radicals represented by R are alkyl radicals, such as the methyl, ethyl, n-propyl, iso-propyl, 1-n-butyl, 2-n-butyl, iso-butyl, tert-butyl, n-pentyl, isopentyl, neopentyl and tert-pentyl radicals, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, octadecyl radicals, such as the n-octadecyl radical; alkenyl radicals, such as the vinyl and the allyl radicals; cycloalkyl radicals, such as cyclopentyl, cyclohexyl and cycloheptyl radicals and methylcyclohexyl radicals; aryl radicals, such as the phenyl, naphthyl and anthryl and phenanthryl radicals; alkaryl radicals, such as o-, m-and p-tolyl radicals, xylyl radicals and ethylphenyl radicals; and aralkyl radicals, such as the benzyl radical, the α-phenylethyl and the β-phenylethyl radicals. The methyl radical is the preferred R radical.

Examples of substituted radicals represented by R are cyanoalkyl radicals, such as the β-cyanoethyl radical, and halogenated hydrocarbon radicals, for example halogenoalkyl radicals, such as the 3,3,3-trifluoro-n-propyl radical, the 2,2,2,2',2,'2'-hexafluoroisopropyl radical and the heptafluroisopropyl radical, and halogenoaryl radicals, such as the o-, m- and p-chlorophenyl radical.

Preferably at least 50% and in particular at least 90% of the number of R radicals in the organopolysiloxanes (1) having alkenyloxy functional groups are methyl radicals because of their availability.

Examples of alkylene radicals represented by $R^1$ are those of the formula

—CH$_2$—

—(CH$_2$)$_2$—
—CH(CH$_3$)— and

—(CH$_2$)$_3$—.

Examples of cycloalkylene radicals represented by $R^1$ are the cyclohexylene radical and the methylcyclohexylene radical The preferred radical represented by $R^1$ is that of the formula —CH$_2$—.

Preferably A is oxygen —O—.

Examples of radicals represented by $R^2$ are those of the formula

—(CH$_2$)$_2$—

—(CH$_2$)$_3$—

—CH$_2$CH(CH$_3$)CH$_2$—

—CH$_2$CH(OH)CH$_2$—

—CH$_2$CH(OCH$_3$)CH$_2$—

—CH$_2$CH(OC$_2$H$_5$)CH$_2$—, and

—CH$_2$CH(OSi(CH$_3$)$_3$)CH$_2$—.

Examples of alkylene radicals represented by $R^1$ are the same as the examples for alkylene radicals represented by $R^3$.

Preferred examples of radicals represented by Y are those of the formula

—(CH$_2$)$_3$—O—CH$_2$—CH=CH$_2$ and
—(CH$_2$)$_3$—O—CH$_2$—CH$_2$—O—CH$_2$—CH=CH$_2$.

If the compositions of this invention are to be substantially free from solvents, which is desirable from an environmental standpoint, for example due to explosions, or it is desirable to reduce shipping and storage costs or avoid the expenditure required for evaporation of the solvent, then the viscosity of the organopolysiloxanes (1) having alkenyloxy functional groups is preferably at most 5,000 mPa·s at 25° C. and more preferably at most 1,000 mPa·s at 25° C. If, however, solvents are used in the compositions of this invention, although not preferred, the organopolysiloxanes (1) having alkenyloxy functional groups can have viscosities of preferably from 5,000 to 5×10$^6$ mPa·s at 25° C. and more preferably from 10$^6$ to 4×10$^6$ mPa·s at 25° C.

A process for preparing the organopolysiloxanes (1) having alkenyloxy functional groups is described in German Application having the file reference P 39 14 896.3 (U.S. Pat. application Ser. No. 07/519,370 and now U.S. Pat. No. 5,057,549).

The organopolysiloxanes (1) having alkenyloxy functional groups are preferably prepared by the addition reaction of an organic compound (1') of the general formula H$_2$C=CH—R$^1$—(A—R$^2$)$_z$—O—R$^3$—CH=CH$_2$, in which $R^1$, $R^2$, $R^3$, A and z are the same as above, with an organopolysiloxane (2') containing Si-bonded hydrogen atoms, in the presence of a catalyst (3') which promotes the addition of Si-bonded hydrogen to an aliphatic double bond, and removing any excess organic compound, by distillation, from the organopolysiloxanes (1) having alkenyloxy functional groups, which are thus formed.

Organopolysiloxanes of the formula

H$_g$R$_{3-g}$—(SiO(SiR$_2$O)$_k$(SiRHO)$_l$SiR$_{3-g}$H$_g$, in which R is the same as above, g is 0 or 1, k is 0 or an integer of from 1 to 1,000 and 1 is 0 or an integer of from 1 to 10, with the proviso that it contains at least one Si-bonded hydrogen atom and more preferably at least two Si-bonded hydrogen atoms per molecule, are preferably used as organopolysiloxanes (2') containing Si-bonded hydrogen atoms, in the addition reaction with the organic compound (1').

The organopolysiloxanes (1) having alkenyloxy functional groups can also be prepared by the addition reaction of the organic compound (1') above with a silane (2") containing an Si-bonded hydrogen, in the presence of a catalyst (3') which promotes the addition of Si-bonded hydrogen to an aliphatic double bond. A silane having alkenyloxy functional groups and containing an Si-bonded radical Y is then obtained, which is then converted to an organopolysiloxane having alkenyloxy functional groups, by mixed hydrolysis with chlorosilanes or alkoxysilanes and/or by a condensation reaction with organopolysiloxanes capable of undergoing condensation, in a manner known per se.

The silane (2") containing an Si-bonded hydrogen atom which is used is preferably a silane of the general formula R$_h$HSiX$_{3-h}$, in which R is the same as above, X is a halogen atom or a $C_{1-8}$-alkoxy radical and h is 0, 1 or 2.

Preferred examples of the organic compound (1') are those of the formula

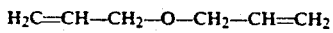

$$H_2C=CH-CH_2-O-CH_2-CH=CH_2$$

and

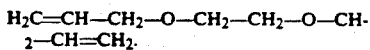

$$H_2C=CH-CH_2-O-CH_2-CH_2-O-CH_2-CH=CH_2.$$

The organic compounds (1') are preferably employed in amounts such that at least 1 mol, and more preferably 1.5 mols, of organic compound (1') are present per gram atom of Si-bonded hydrogen in the organopolysiloxane (2') or in the silane (2"). More preferably organic compound (1') is employed in amounts such that 4 to 8 mols of organic compound (1') are present per gram atom of Si-bonded hydrogen in the organopolysiloxane (2') or in the silane (2"). As a result of this excess of organic compound (1') it appears that the di-addition is surpressed; that is the addition appears to take place in the main only at one of the two terminal aliphatic double bonds in the organic compound (1'); instead of at both terminal aliphatic double bonds in the organic compound (1').

Thus, for example, when 6 mols to 8 mols of diallyl ether are reacted with 1 mol of α,w-dihydrogenodimethylpolysiloxane a di-addition to diallyl ether takes place to a small extent, so that dimethylpolysiloxanes (1), having allyloxypropyl functional groups, which, in addition to the terminal allyloxypropyldimethylsiloxane units, contain bridge units of the formula

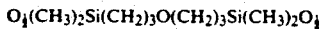

$$O_{\frac{1}{2}}(CH_3)_2Si(CH_2)_3O(CH_2)_3Si(CH_3)_2O_{\frac{1}{2}}$$

are also obtained to a small degree (5 mol % to 25 mol %).

Organopolysiloxanes (1), having alkenyl functional groups, which contain such bridge units as a result of the di-addition do not interfere when used in the compositions of this invention.

The organopolysiloxanes (1) having alkenyloxy functional groups, which are thus obtained, can then be equilibrated with organopolysiloxane (4') selected from the group consisting of straight-chain organopolysiloxanes having terminal triorganosiloxy groups, straight-chain organopolysiloxanes having terminal hydroxyl groups, cyclic organopolysiloxanes and copolymers of diorganosiloxane and monoorganosiloxane units. Organopolysiloxanes (1), having alkenyloxy functional groups, of different types can also be equilibrated with one another.

In the compositions of this invention, one type of organopolysiloxane having alkenyloxy functional groups or various types of organopolysiloxanes having alkenyloxy functional groups can be employed.

The organopolysiloxanes (2) containing Si-bonded hydrogen atoms used in the compositions of this invention can also be the same organopolysiloxanes containing Si-bonded hydrogen atoms which have been or could have been employed heretofore in compositions containing an organopolysiloxane having vinyl groups, an organopolysiloxane containing Si-bonded hydrogen atoms and a catalyst which promotes the addition of Si-bonded hydrogen to an aliphatic double bond.

Preferably, the organopolysiloxanes (2) contain at least 3 Si-bonded hydrogen atoms.

The organopolysiloxanes (2) are preferably those of the general formula

$$H_dR_{3-d}SiO(SiR_2O)_q(SiRHO)_pSiR_{3-d}H_d, \quad (III)$$

in which R is the same as above, d is 0 or 1, q is 0 or an integer of from 1 to 100 and p is 0 or an integer of from 1 to 100, with the proviso that they contain at least 3 Si-bonded hydrogen atoms per molecule.

Preferably d is 0 and the ratio of q:p is preferably 9:1 to 1:9; and more preferably the ratio of q:p is 9:1 to 2.5:1.

The radicals represented by R in the organopolysiloxanes (2) are preferably methyl, ethyl or phenyl radicals.

Preferably, the proportion of Si-bonded hydrogen atoms is from 0.2 to 1.66% by weight, and in particular from 1.2 to 1.66% by weight, based on the weight of the organopolysiloxanes (2).

The organopolysiloxanes (2) can also be star-shaped compounds of the general formula

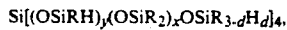

$$Si[(OSiRH)_y(OSiR_2)_xOSiR_{3-d}H_d]_4,$$

in which R is the same as above and d is 0 or 1, preferably 0, x is 0 or an integer of from 1 to 4 and y is 0 or an integer of from 1 to 4, with the proviso that said compounds contain at least 3 Si-bonded hydrogen atoms per molecule.

Examples of organopolysiloxanes (2) are, in particular, copolymers consisting of dimethylhydrogenosiloxane, methylhydrogenosiloxane, dimethylsiloxane and trimethylsiloxane units, copolymers consisting of trimethylsiloxane, dimethylhydrogenosiloxane and methylhydrogenosiloxane units, copolymers consisting of trimethylsiloxane, dimethylsiloxane and methylhydrogenosiloxane units, copolymers consisting of methylhydrogenosiloxane and trimethylsiloxane units, copolymers consisting of methylhydrogenosiloxane, diphenylsiloxane and trimethylsiloxane units, copolymers consisting of methylhydrogenosiloxane, dimethylhydrogenosiloxane and diphenylsiloxane units, copolymers consisting of methylhydrogenosiloxane, phenylmethylsiloxane, trimethylsiloxane and/or dimethylhydrogenosiloxane units, copolymers consisting of methyl hydrogenosiloxane, dimethylsiloxane, diphenylsiloxane, trimethylsiloxane and/or dimethylhydrogenosiloxane units and also copolymers consisting of dimethylhydrogenosiloxane, trimethylsiloxane, phenylhydrogenosiloxane, dimethylsiloxane and/or phenylmethylsiloxane units.

Processes for the preparation of organopolysiloxanes (2), including those organopolysiloxanes (2) of the preferred type, are generally known.

Organopolysiloxane (2) is preferably employed in amounts of from 0.5 to 6, and more preferably from 1 to 3 gram atoms of Si-bonded hydrogen per mol of Si-bonded radical Y in the organopolysiloxanes (1) having alkenyloxy functional groups.

The catalyst (3) which promotes the addition of Si-bonded hydrogen to an aliphatic double bond which is used in the compositions of this invention can be the same catalysts which have been or could have been employed heretofore to promote crosslinking of compositions containing organopolysiloxanes having aliphatic double bonds and compounds which contain Si-bonded hydrogen. Platinum metals or their compounds, and in particular platinum and its compounds, are preferably employed. Examples of such catalysts are platinum metal and finely divided platinum, which can be supported on carriers, such as silicon dioxide, aluminum oxide or active charcoal, platinum compounds or complexes, such as platinum halides, for example $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6$, $6H_2O$ and cyclohexanone, platinum-vinyl-siloxane complexes, in particular platinum-1,3-divinyl-1,1,3,3-tetramethyldisiloxane complexes, which may or may not contain detectable inorganically bonded halogen, bis-(gamma-picoline)-platinum dichloride, trimethylene-dipyridine-platinum dichloride, dicyclopentadiene-platinum dichloride, dimethylsulfoxyethylene-platinum(II) dichloride, reaction products of platinum tetra-chloride with olefin and primary amine or secondary amine or primary and secondary amine, such as the reaction product obtained from platinum tetrachloride dissolved in 1-octene with secbutylamine, ammonium-platinum complexes according to EP-B 110 370, cyclooctadiene-platinum dichloride and norbornadiene-platinum dichloride.

Further examples of catalysts (3) are those which are slightly soluble in the composition at room temperature but are soluble at elevated temperature, such as gamma-picoline-platinum dichloride, cyclopentadiene-platinum dichloride, cyclooctadiene-platinum dichloride and mixtures of platinum-vinylsiloxane complexes, in particular platinum-divinyltetramethyldisiloxane complexes, and dimethylpolysiloxane which contain diphenylsiloxane units, preferably about 10 mol % of diphenylsiloxane units, the mixtures preferably containing about 1% by weight of platinum, calculated as the element. Such catalysts are preferably employed in inhibitor-free compositions.

Catalyst (3) is preferably employed in amounts of from 5 to 500 ppm by weight (parts by weight per million parts by weight), and more preferably from 10 to 200 ppm by weight, calculated as elemental platinum metal and based on the total weight of the organopolysiloxanes (1) and (2).

Agents (4) which delay the addition of Si-bonded hydrogen to an aliphatic double bond at room temperature, so-called inhibitors, can also be used as a further constituent in the compositions of this invention, even though their use is not preferred. Agents (4) which delay the addition of Si-bonded hydrogen to an aliphatic double bond at room temperature which are used in the compositions of this invention include all agents which delay the addition of Si-bonded hydrogen to an aliphatic double bond at room temperature which have been or could have been used heretofore. Examples of agents which delay the addition of Si-bonded hydrogen to an aliphatic double bond at room temperature, so-called inhibitors, are 1,3-divinyl-1,1,3,3-tetramethyldisiloxane, benzotriazole, dialkylformamides, alkylthioureas, methyl ethyl ketoxime, organic or silicon-organic compounds having a boiling point of at least 25° C. at 1012 mbar (abs.) and at least one aliphatic triple bond, in accordance with U.S. Pat. No. 3,445,420, such as 1-ethinylcyclohexan-1-ol, 2-methyl-3-butin-2-ol, 3-methyl-1-pentin-3-ol, 2,5-dimethyl-1-hexin-3-ol, inhibitors according to U.S. Pat. No. 2,476,166, such as a mixture containing diallyl maleate and vinyl acetate, and inhibitors according to U.S. Pat. No. 4,504,645, in particular maleic acid monoesters of the general formula $$HOOC-CH=CH-COOR_5,$$

in which $R^5$ represents an organic radical, preferably a monovalent hydrocarbon radical having from 1 to 12 carbon atoms per radical or a halogenated monovalent hydrocarbon radical having from 1 to 12 carbon atoms per radical. Examples of radicals represented by R having from 1 to 12 carbon atoms per radical apply also to the $R^5$ radicals.

Additional examples of inhibitors are inhibitors which can be destroyed by irradiation with ultraviolet light, for example reaction products of benzophenone derivatives and alkinols.

Preferably, agent (4) which delays the addition of Si-bonded hydrogen to an aliphatic double bond at room temperature is employed in amounts of from 0.001 to 10% by weight, based on the total weight of the organopolysiloxanes (1) and (2). If maleic acid monoester is used as inhibitor (4), it is preferably employed in amounts of from 0.001 to 3% by weight, and more preferably from 0.005 to 0.05% by weight, based on the total weight of the organopolysiloxanes (1) and (2).

In order to adjust the release values of the coatings which repel sticky substances using the compositions of this invention, it is possible to use in the compositions of this invention, silicone resins consisting of units of the formula $$R^4(CH_3)_2SiO_{\frac{1}{2}} \text{ and } SiO_2,$$

so-called MQ resins, in which $R^4$ is a hydrogen atom, a methyl radical, an allyl radical or a radical Y (in which Y has the same meaning as above) such as an allyloxypropyl radical, and the units of the formula $R^4(CH_3)_2SiO_{\frac{1}{2}}$ can be the same or different. In the silicone resins the ratio of monofunctional units of the formula $R^4(CH_3)_2SiO_{\frac{1}{2}}$ to tetrafunctional units of the formula $SiO_2$ is preferably from 0.6 to 2, and more preferably from 1.0 to 1.5.

The solvents which are optionally used in the compositions of this invention can be the same solvents which have been or could have been used heretofore in compositions consisting of organopolysiloxanes containing Si-bonded vinyl groups, organopolysiloxanes containing Si-bonded hydrogen and a catalyst which promotes addition of Si-bonded hydrogen to an aliphatic double bond. Examples of such solvents are benzines, for example alkane mixtures having a boiling range of from 80° C. to 110° C. at 1020 mbar (abs.), n-heptane, benzene, toluene and xylenes, halogenated alkanes having from 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are used, they are generally employed in amounts of from 10 to 95% by weight, based on the weight of the organopolysiloxanes (1) having alkenyloxy functional groups.

The sequence in which the constituents (1), (2), (3) and, where appropriate, (4) are mixed is not critical; however, it is preferred that component (3), that is, the catalyst, be added last to the mixture containing the other constituents.

Preferably the compositions of this invention containing the constituents (1), (2), (3) and, where appropriate, (4) are prepared in the form of two-component compositions, that is, constituents (2) and (3) are separated from one another. The two components can, for example, be present in a container having two mixing chambers which are separate from one another, the mixing of the two components taking place via a mixing nozzle shortly before their use.

The constituents (1), (2) and (3) are preferably mixed with one another at −5° C. to 25° C. The pot life of the compositions is preferably from 1 to 40 minutes.

The crosslinking of the inhibitor-free compositions, which are preferably used, preferably takes place at room temperature (23° C.) to 80° C. in 2 to 60 seconds. Energy sources used for the crosslinking by heating are, preferably, ovens, for example circulating air ovens, heating ducts, heated rollers, heated plates or heat radiation in the infrared region. At room temperature, i.e., at 23° C., the crosslinking takes place in 15 to 60 seconds and at a heating temperature of 60° C. to 80° C. in 2 to 15 seconds.

With the short crosslinking times, the temperature of the substrate to be coated is considerably lower than the heating temperature, for example of the oven. The low crosslinking temperatures and short crosslinking times have, in addition to saving energy and greater economy, a further advantage that the substrates to be coated are subjected to little thermal stress, so that, for example, paper does not lose its natural moisture content as a result of the coating and remains dimensionally stable, and also thermoplastic films, such as polyethylene, polypropylene and polyvinyl chloride films, can be coated without shrinking.

After crosslinking, the compositions give tack-free and migration-free coatings, so that the adhesive power of the adhesives which come into contact with the coatings is essentially unimpared. Furthermore, coatings are obtained which are abrasion-resistant. When the compositions are crosslinked, in particular at room temperature, the abrasion resistance is not always obtained immediately after the crosslinking of the coatings, but in some cases the abrasion resistance is obtained only after further storage of the crosslinked coatings at room temperature in 50 minutes to 24 hours.

Temperatures of at least 80° C. are required for crosslinking of the compositions containing inhibitor. The pot life of the compositions is about 1 to 12 hours at room temperature. The advantage of using an inhibitor lies solely in the prolongation of the pot life of the compositions.

Although this is not preferred, it is also possible to crosslink both the inhibitor-free and the inhibitor-containing compositions by irradiation with ultraviolet light or by irradiation with UV and IR light, as well as by heating. The ultraviolet light used is customary ultraviolet light having a wavelength of 253.7 nm. A multiplicity of lamps which emit ultraviolet light having a wavelength of 200 to 400 nm and preferentially emit ultraviolet light at a wavelength of 253.7 nm, are available commercially.

Crosslinkable compositions which contain organopolysiloxanes having allyl groups or hexenyl groups instead of the organopolysiloxanes (1) having alkenyloxy functional groups, that is to say which have Si-bonded allyl or hexenyl radicals instead of the Si-bonded radicals Y in the organopolysiloxanes (I), also crosslink at 23° C. (room temperature) to 80° C. in a few seconds up to 1 minute and give tack-free and migration-free coatings which after brief storage at room temperature display abrasion resistance.

On the other hand, crosslinkable compositions which contain Si-bonded vinyl radicals instead of the Si-bonded radicals Y in the organopolysiloxanes (1), that is to say those of the initially mentioned type, do not crosslink at room temperature, but give coatings which are not tack-free and are not migration-resistant, that is to say migrate into the adhesive which comes into contact with these coatings and as a result considerably impair the adhesive power of the adhesives.

The application of the compositions of this invention to the surfaces to be rendered repellent to sticky substances can be carried out in any desired manner which is suitable and frequently used for the production of coatings from liquid substances, such as for example by dipping, spreading, casting, spraying, rolling-on, printing, for example using an offset gravure coating installation, blade or doctor blade coating or using an air brush. A multi-roller system (4–5 rollers), such as rubber-steel-rubber etc., with which the film is divided so frequently that an application of 0.6 to 1.2 μm is finally obtained, is particularly suitable for the application.

The surfaces which are to be rendered repellent to sticky substances and which can be treated in accordance with this invention can be surfaces of any desired substances which are solid at room temperature and 1012 mbar (abs.). Examples of such surfaces are those of paper, wood, cork and plastic films, for example polyethylene films or polypropylene films, woven and non-woven fabric consisting of natural or synthetic fibers or glass fibers, ceramic articles, glass, metals, paper coated with polyethylene and boards, including those made of asbestos. The polyethylene mentioned above can be, in each case, high-pressure, medium-pressure or low-pressure polyethylene. The paper can be low-grade types of paper, such as absorbent papers, including raw kraft paper, that is to say kraft paper which has not been pre-treated with chemicals and/or natural polymer substances, having a weight of 60 to 150 g/m$^2$, unsized papers, papers having a low freeness value, wood-containing papers, papers which have not been glazed or have not been calendered, papers which, as a result of the use of a dry glazing cylinder during their production are glazed on one side without further expensive measures and are therefore termed "one-sided machine-glazed papers", uncoated papers or papers produced from paper waste, that is to say so-called recycled papers. The paper to be treated according to the invention can, however, of course also be high-grade types of paper, such as low-absorbency papers, sized papers, papers having a high freeness value, wood-free papers, calendered or glazed papers, glassine papers, parchmentized papers, or precoated papers. The boards can also be high or low grade.

The compositions of this invention are suitable, for example, for the production of release, masking and interleaving papers, including interleaving papers which are employed in the production of, for example, cast or decorative films or of foams, including polyurethane foams. The compositions of this invention are further suitable, for example, for the production of release, masking and interleaving cardboards, films and fabrics, for finishing the backs of pressure-sensitive tapes or pressure-sensitive films or the letter-bearing sides of pressure-sensitive labels. The compositions of this invention are also suitable for finishing packaging materials, such as packaging material made of paper, cardboard boxes, metal foils and containers, for example cardboard, plastic, wood or iron, which is or are intended for storage and/or shipping of sticky materials, such as adhesives, sticky foodstuffs, for example cake, honey, sweets and meat, bitumen, asphalt, greased materials and raw rubber. A further example of the use of the compositions of this invention is the finishing of supports for transferring adhesive coats in the so-called "transfer process".

The compositions of this invention are suitable for the production of pressure-sensitive materials associated with the release paper, both by the off-line process and by the in-line process. In the case of the off-line process, the silicone composition is applied to the paper and crosslinked, then, in a subsequent step, usually after winding the release paper onto a roll and after storing the roll, an adhesive film, which, for example, is on a label face paper, is applied to the coated paper and the composite is then pressed together. In the case of the in-line process, the silicone composition is applied to the paper and cross-linked, the silicone coating is coated with the adhesive, the label face paper is then applied to the adhesive and finally the composite is pressed together In the case of the off-line process, the speed of winding depends on the time which is needed to render the silicone coating tack-free In the case of the in-line process the process speed depends on the time which is needed to render the silicone coating migration-free. Using the compositions of this invention, the off-line process and the in-line process can be operated at a speed of from 50 to 500 m/min, preferably from 100 to 300 m/min.

The mixture of platinum-divinyltetramethyldisiloxane complex and diluent used in the following examples was prepared as follows:

About 20 parts by weight of sodium bicarbonate were added to a mixture containing 10 parts by weight of $H_2PtCl_6 \cdot 6H_2O$, 20 parts by weight of 1,3-divinyl-1,1,3,3-tetramethyldisiloxane and 50 parts by weight of ethanol. The mixture was heated to boiling under reflux for 30 minutes, with stirring, then allowed to stand at room temperature for 15 hours and then filtered. The volatile constituents were distilled off from the filtrate at about 16 hPa (abs.). About 17 parts by weight of a liquid were obtained as residue, which was dissolved in benzene. The solution was filtered and the benzene distilled off from the filtrate. The residue was mixed with dimethylpolysiloxane containing vinyldimethylsiloxane units as terminal units and having a viscosity of 1,400 mPa·s at 25° C. as diluent in an amount such that the mixture contains 1% by weight of platinum, calculated as the element.

EXAMPLE 1

(a) About 28 g of trimethylbenzylammonium chloride (0.1 mol) are added to a solution containing 600 g of NaOH (15 mol) in 600 ml of water. About 290 g of allyl alcohol (5.0 mol) and 425 g of allyl chloride (5.5 mol) are then added to this mixture. The reaction mixture is heated at 40° to 60° C. for eight hours. The sodium chloride precipitate formed is then substantially dissolved in water. The organic phase is separated off and dried over sodium sulfate. About 415 g of diallyl ether (85% of theory) are obtained by means of distillation through a short Vigreaux column at 92° to 94° C. (b) About 600 g of diallyl ether, which was prepared as described in (a) above, are heated to reflux. A mixture containing 210 g of 1,1,3,3-tetramethyldisiloxane and 60 mg of platinum in the form of a solution of platinum tetrachloride in 1-octene is added dropwise to the diallyl ether, with stirring, over a period of 6 hours After stirring for an additional 1.5 hours, the mixture is cooled. About 99% of the Si-bonded hydrogen atoms of the 1,1,3,3-tetramethyldisiloxane were converted. The volatile constituents are then removed by distillation at 80° C. and 5 hPa (abs.). About 423 g of a pale yellow, clear oil having a viscosity of 6.2 mm²·s⁻¹ at 25° C. and an iodine number of 112 are obtained. A 1,3-allyloxypropyltetramethyldisiloxane of the formula

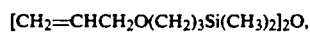

is obtained, which, according to the ¹H NMR spectrum also contains bridge units of the formula

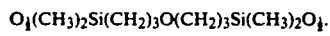

A value of 1.44 can be derived from the ¹H NMR spectrum for the ratio of dimethylsiloxane units to allyloxypropyl groups.

(c) About 14.5 g of the 1,3-allyloxypropyltetramethyldisiloxane, the preparation of which is described in (b) above, are equilibrated with 356 g of a mixture of cyclic dimethylsiloxanes containing 3 to 10 siloxane units per molecule and 1.5 g of a 30% strength solution of potassium hydroxide in methanol for 8 hours at 140° C. First 1 g of glacial acetic acid and then 5 g of acid alumina are added to the mixture. After filtering, the volatile constituents are removed by distillation at 120° C. and $10^{-3}$ hPa (abs.). According to the ¹H NMR spectrum, a dimethylpolysiloxane is obtained which has allyloxypropyldimethylsiloxy groups in the terminal units and contains, on an average, about 150 siloxane units, including, to a small extent, bridge units as described earlier in (b) above, and has a viscosity of 480 mm²·s⁻¹ at 25° C. and an iodine number of 4.4.

(d) About 100 parts by weight of the dimethylpolysiloxane containing allyloxypropyldimethylsiloxy groups in the terminal units and having a viscosity of 480 mm²·s⁻¹ at 25° C., the preparation of which is described in (c) above, are mixed, at 23° C., with 2.5 parts by weight of a copolymer consisting of methylhydrogenosiloxane and trimethylsiloxane units and containing, on an average, 25 methylhydrogenosiloxane units per molecule. About 1 part by weight of the mixture of platinum-divinyltetramethyldisiloxane complex and diluent, the preparation of which is described above, is added to the mixture so that it contains 100 ppm by weight of platinum, calculated as the element and based on the weight of the polysiloxane mixture.

The mixture thus obtained is applied in an amount of about 3.8 g/m², using a glass rod, to glazed glassine paper which weights 67 g/m² and also has low absorbency for water. The coating crosslinks after 35 seconds at room temperature (23° C.) to give a tack- and migration-free coating, which is abrasion-resistant after storing at room temperature (23° C.) for an additional 10 seconds.

FINAT 10 and 11 test values for determination of the release value and the residual adhesive power, printer in "Suppliers and Users Technical Manual", June 1980, pages 21 to 24, using commercially available pressure-sensitive 2.5 cm wide adhesive tapes "Tesafilm No. 154", "Tesafilm No. 651", "K 7476" and "Tesafilm A 7475" (Beiersdorf AG, Hamburg, Federal Republic of Germany; the "Tesa" part of the above words is a registered trade mark) are summarized in Table 1.

TABLE 1

| Adhesive Tape | Release value cN/cm | Residual Adhesive power % |
|---|---|---|
| Tesa 154 | 9.5 | 81 |
| Tesa 651 | 7.3 | |
| Tesa K 7476 | 7.9 | |
| Tesa A 7475 | 11.7 | |

A second glassine paper was coated as described above and hung for 5 seconds in a circulating air oven at 60° C. The surface temperature of the glassine paper is 40° C. during this period. A tack- and migration-free and abrasion-resistant coating is obtained The determination of the release value and of the residual adhesive power was carried out in accordance with FINAT 10 and 11, as described above. The test values are shown in Table 2.

TABLE 2

| Adhesive Tape | Release value cN/cm | Residual Adhesive power % |
|---|---|---|
| Tesa 154 | 4.7 | 93 |
| Tesa 651 | 7.4 | |
| Tesa K 7476 | 9.8 | |
| Tesa A 7475 | 9.3 | |

EXAMPLE 2

The procedure of Example 1 is repeated except that the mixture is applied to a corona-pretreated, 60 μm thick HDPE film (HDPE=high density polyethylene), the surface tension of which after the corona treatment is 48 dyn/cm, instead of glassine paper. The coated low-pressure polyethylene film is hung for 6 seconds in a circulating air oven at 60° C. The low-pressure polyethylene film assumes a surface temperature of 44° C. during this period A tack- and migration-free and abrasion-resistant coating is obtained. Under these curing conditions, the low-pressure polyethylene film suffers no damage and does not shrink. FINAT 10 and 11 test values to determine the release value and the residual adhesive power, printed in "Suppliers and Users Technical Manual", June 1980, pages 21 to 24, using commercially available pressure-sensitive 2.5 cm wide adhesive tapes "Tesafilm No. 154". "Tesafilm No. 651", "Tesafilm K 7476" and "Tesafilm A 7475" (Beiersdorf AG, Hamburg, Federal Republic of Germany; the "Tesa" part of the above names is a registered trade mark) are shown in Table 3.

TABLE 3

| Adhesive Tape | Release value cN/cm | Residual Adhesive power % |
|---|---|---|
| Tesa 154 | 2.7 | 75 |
| Tesa 651 | 6.7 | |
| Tesa K 7476 | 6.3 | |
| Tesa A 7475 | 14.1 | |

EXAMPLE 3

The procedure of Example 1 is repeated, except that the mixture is applied to a corona-pretreated 50 μm thick LDPE film (LDPE=low density polyethylene) instead of glassine paper. The coated high-pressure polyethylene film is hung for 6 seconds in a circulating air oven at 66° C. The high-pressure polyethylene film assumes a surface temperature of 41° C. during this period. A tack-and migration-free and abrasion-resistant coating is obtained. Under these curing conditions, the high-pressure polyethylene film suffers no damage and does not shrink. FINAT 10 and 11 test values to determine the release value and the residual adhesive power, printed in "Suppliers and Users Technical Manual", June 1980, pages 21 to 24, using commercially available pressuresensitive 2.5 cm wide adhesive tapes "Tesafilm No. 154", "Tesafilm No. 651", "Tesafilm K 7476" and "Tesafilm A 7475 AG, Hamburg, Federal Republic of Germany; the "Tesa" part of the above names is a registered trade mark) are shown in Table 4.

TABLE 4

| Adhesive Tape | Release value cN/cm | Residual Adhesive power % |
|---|---|---|
| Tesa 154 | 6.3 | 68 |
| Tesa 651 | 7.9 | |
| Tesa K 7476 | 6.6 | |
| Tesa A 7475 | 16.4 | |

EXAMPLE 4

About 80 parts by weight of the dimethylpolysiloxane containing allyloxypropyldimethylsiloxy groups in the terminal units and having a viscosity of 480 $mm^2 \cdot s^{-1}$ at 25° C, the preparation of which is described in Example 1 (c) above, are mixed with 20 parts by weight of a silicone resin consisting of dimethylhydrogenosiloxane units and $SiO_2$ units with a ratio of dimethylhydrogenosiloxane units to $SiO_2$ units of 1.0:1.4. About 4.2 parts by weight of a copolymer consisting of methylhydrogenosiloxane and trimethylsiloxane units with, on an average, 25 methylhydrogenosiloxane units per molecule and 1.0 part by weight of the mixture of platinum-divinyltetramethyldisiloxane complex and diluent, the preparation of which is described above, are added to this mixture.

The mixture thus obtained is applied to a thickness of 4 μm, using a glass rod, to glazed glassine paper which weights 67 g/m² and also has low absorbency for water. After 50 seconds at room temperature (23° C.), the coating crosslinks to give a tack- and migration-free and abrasion-resistant coating. FINAT 10 and 11 test values to determine the release value and the residual adhesive power, printed in "Suppliers and Users Technical Manual", June 1980, pages 21 to 24, using commercially available pressure-sensitive 2.5 cm wide adhesive tapes "Tesafilm No. 154", Tesafilm K 7476" and "Tesafilm A 7475" (Beiersdorf AG, Hamburg, Federal Republic of Germany; the "Tesa" part of the above names is a registered trade mark) are shown in Table 5.

TABLE 5

| Adhesive Tape | Release value cN/cm | Residual Adhesive power % |
|---|---|---|
| Tesa 154 | — | 77 |
| Tesa K 7476 | 12.7 | |
| Tesa A 7475 | 19.6 | |

A second glassine paper is coated as described above and hung for 7 seconds in a circulating air oven at 60° C. The surface temperature of the glassine paper is 47° C. during this period. A tack- and migration-free and abrasion-resistant coating is obtained.

EXAMPLE 5

(a) About 200 g of the dimethylpolysiloxane containing terminal allyloxypropyldimethylsiloxy groups and having a viscosity of 480 $mm^2 s^{-1}$ at 25° C., the preparation of which is described in Example 1 (c) above, are equilibrated with 200 g of a dimethylpolysiloxane containing terminal hydroxyl groups and having a viscosity of 20,000 mm²s⁻¹ at 25° C. and 40 mg of phosphonitrile chloride in the form of a 40% solution in ethyl acetate for 3 hours at 120° C.

To render the phosphonitrile chloride inactive, 4 g of MgO are added and after 16 hours the reaction mixture is filtered to give a clear filtrate. The volatile constituents are removed by distillation for 1 hour at 100° C. and 5 hPa (abs.). A dimethylpolysiloxane is obtained which contains terminal allyloxypropyldimethylsiloxy groups and has, on an average, 310 dimethylsiloxane units and has a viscosity of 1,890 mm²s⁻¹ at 25° C. and an iodine number of 2.2.

(b) About 100 parts by weight of the dimethylpolysiloxane containing terminal allyloxypropyldimethylsiloxy groups and having a viscosity of 1,890 mm²s⁻¹ at 25° C., the preparation of which is described in (a) above, are mixed with 1.3 parts by weight of a copolymer consisting of methylhydrogenosiloxane units and trimethylsiloxane units and having a viscosity of 60 mm²s⁻¹ at 25° C. The mixture is cooled to 0° C. in a cryostat and 100 ppm by weight of platinum, calculated as the element and based on the mixture, are then added in the form of the mixture of platinum-divinyltetramethyldisiloxane complex and diluent, the preparation of which has been described above. The pot life of the mixture is 7 minutes.

The mixture obtained in this manner is applied in an amount of about 3.8 g/m², using a glass rod, to glazed glassine paper which weighs 67 g/m² and also has low absorbency for water. The coated glassine paper is hung for 5 seconds in a circulating air oven at 60° C. The surface temperature of the glassine paper is about 42° C. during this period. A tack-free and migration-free coating is obtained, which is abrasion-resistant after storing for 24 hours at room temperature.

A second glassine paper is coated as described above and is crosslinked at room temperature (23° C.) over a period of about 35 seconds to give a tack-free and migration-free coating. After storing for 24 hours at room temperature, the coating is abrasion-resistant. FINAT 10 and 11 test values, printed in "Suppliers and Users Technical Manual", June 1980, pages 21 to 24, using commercially available pressure-sensitive 2.5 cm wide adhesive tapes "Tesafilm No. 154", Tesafilm 651" and "Tesafilm A 7475" (Beiersdorf AG, Hamburg, Federal Republic of Germany; the "Tesa" part of the above names is a registered trade mark) are shown in Table 6.

TABLE 6

| Adhesive Tape | Release value cN/cm | Residual Adhesive power % |
|---|---|---|
| Tesa 154 | 4.0 | 94 |
| Tesa 651 | 8.2 | |
| Tesa A 7475 | 14.4 | |

EXAMPLE 6

(a) Ethylene glycol bisallyl ether is obtained by reacting allyl chloride with ethylene glycol, in a manner similar to the preparation of diallyl ether described in Example 1 (a) above.

(b) About 1.5 ml of a solution of platinum tetrachloride in 1-octene, which contains 60 mg of platinum, calculated as the element, is added to 142 g of ethylene glycol bisallyl ether. About 69 g of a dimethylpolysiloxane which contains dimethylhydrogenosiloxy groups as terminal units and has an average molecular weight of 690 g/mol is added dropwise to this mixture, which is heated to 130° C. After more than 99% of all Si-bonded hydrogen atoms in the dimethylpolysiloxane have finished reacting, all constituents which are volatile at 100° C. and 5 hPa (abs.) are removed by distillation. The clear product, a dimethylpolysiloxane containing terminal units of the formula

$$CH_2=CHCH_2OCH_2CH_2O(CH_2)_3(CH_3)_2SiO_{\frac{1}{2}}$$

and having an average ratio of Si-bonded allyloxyethoxypropyl radicals to Si-bonded methyl radicals of 0.104, has a viscosity of 13.8 mm²·s⁻¹ at 25° C.

(c) About 20 g of the dimethylpolysiloxane containing terminal allyloxyethoxypropyldimethylsiloxane units, the preparation of which is described in (b) above, are equilibrated with 200 g of a mixture of cyclic dimethylpolysiloxanes containing 3 to 10 siloxane units per molecule and 0.5 g of a 40% strength solution of potassium hydroxide in methanol for 4 hours at 140° C. The reaction mixture is neutralized with acetic acid and filtered with the addition of 0.5% of alumina. The volatile constituents are removed by distillation at 100° C. and 5 hPa (abs.). The dimethylpolysiloxane containing terminal units of the formula

$$CH_2=CHCH_2OCH_2CH_2O(CH_2)_3(CH_3)_2SiO_{\frac{1}{2}}$$

which is thus obtained is a pale yellow, clear polymer which has a viscosity of 412 mm²·S⁻¹ at 25° C. and an iodine number of 3.63 and accordingly has a molecular weight of about 14,000 g/mol.

(d) About 100 parts by weight of the dimethylpolysiloxane containing terminal allyloxyethoxypropyldimethylsiloxane units and having a viscosity of 412 mm²·s⁻¹ at 25° C., the preparation of which is described in (c) above, are mixed with 2.5 parts by weight of a copolymer consisting of methylhydrogenosiloxane and trimethylsiloxane units and having, on an average, 25 methylhydrogenosiloxane units per molecule. The mixture is cooled to +5° C. in a cryostat and 100 ppm by weight of platinum, calculated as the element and based on the mixture, in the form of the mixture of platinum-divinyltetramethyldisiloxane complex and diluent, the preparation of which has been described above, are then added. The pot life of the mixture is 38 minutes.

The mixture thus obtained is applied in an amount of about 3.8 g/m², using a glass rod, to glazed glassine paper which weights 67 g/m² and also has low absorbency for water. The coating crosslinks in 55 seconds at room temperature (23° C.) to give a tack- and migration-free coating A second glassine paper is coated as described above and hung for 15 seconds in a circulating air oven at 60° C. A tack-and migration-free coating is obtained. The residual adhesive power was determined in accordance with FINAT 11 using commercially available pressure-sensitive 2.5 cm wide adhesive tape "Tesafilm No. 154" (Beiersdorf AG, Hamburg, Federal Republic of Germany; the "Tesa" part of the above name is a registered trade mark): Residual adhesive power: 87%.

A third glassine paper is coated as described above and hung for 5 seconds in a circulating air oven at 80° C. A tack- and migration-free coating is obtained, which is not yet abrasion-resistant. FINAT 10 and 11 test values to determine the release value and the residual adhesive power, printed in "Suppliers and Users Technical Manual", June 1980, pages 21 to 24, using commercially available pressure-sensitive 2.5 cm wide adhesive tape "Tesafilm No. 154", "Tesafilm No. 651" and "Tesafilm A 7475" (Beiersdorf AG, Hamburg, Federal Republic of Germany; the "Tesa" part of the above name is a registered trade mark) are shown in Table 7.

TABLE 7

| Adhesive Tape | Release value cN/cm | Residual Adhesive power % |
|---|---|---|
| Tesa 154 | 6.6 | 92 |
| Tesa 651 | 15.6 | |
| Tesa A 7475 | 56 | |

A fourth glassine paper is coated as described above and hung for 15 seconds in a circulating air oven at 80° C. A tack-and migration-free and abrasion-resistant coating is obtained.

EXAMPLE 7

(a) About 294 g of diallyl ether, the preparation of which is described in Example 1 (a) above, together with 0.5 ml of a solution of platinum tetrachloride in 1-octene, which contains 20 mg of platinum, calculated as the element, are initially introduced into a three-necked flask fitted with an internal thermometer and a reflux condenser and the mixture is heated to the reflux temperature. About 101 g of methylhydrogenodichlorosilane are then added dropwise to this mixture over a period of two hours, the gas space temperature remaining between 86° and 91° C. The reaction mixture is allowed to react for an additional two hours at this temperature. The excess diallyl ether is then distilled off through a short packed column and (allyloxypropyl)-methyldichlorosilane is obtained in 70% yield by fractional distillation through a Vigreaux column at 80° to 85° C. and 7 hPa (abs.).

(b) A mixture containing 195 g (1.5 mol) of dimethyldichlorosilane and 107 g (0.5 mol) of (allyloxypropyl)-methyldich silane, the preparation of which is described in (a) above, is added dropwise to a mixture containing 100 ml of concentrated hydrochloric acid, 200 ml of water and 600 ml of toluene, with vigorous stirring The reaction mixture is then stirred for an additional 0.5 hour. The toluene phase is then washed three times with, in each case, 300 ml of water and once with 300 ml of 2% strength NaHCO$_3$ solution. After distilling off the toluene, a clear, yellowish oil having a viscosity of 8.2 mm$^2$·s$^{-1}$ at 25° C. and an iodine number of 62.5 is obtained. The $^1$H NMR spectrum shows a ratio of Si-bonded allyloxypropyl radicals to Si-bonded methyl radicals of 1:7 for the cohydrolyzed product.

(c) About 81 g of the cohydrolyzed product described earlier in (b) above, are polymerized in the presence of 100 ppm by weight of phosphonitrile chloride at 80° C. under vacuum and then equilibrated with 520 g of a dimethylpolysiloxane containing terminal trimethylsiloxy groups and having a viscosity of 350 mm$^2$·s$^{-1}$ at 25° C., with the addition of 100 ppm by weight of phosphonitrile chloride for 4 hours at 120° C. In order to render the phosphonitrile chloride inactive, the reaction mixture is stirred for 16 hours with 6 g of magnesium oxide, the reaction mixture is then filtered and the volatile constituents are then removed by distillation at 100° C. and 5 hPa (abs.). A clear yellow solution is obtained which has a viscosity of 330 mm$^2$·s$^{-1}$ at 25° C. and an iodine number of 8.4. In addition to the terminal trimethylsiloxane units and the dimethylsiloxane units, the polymer thus obtained contains on an average, 4 allyloxypropylmethylsiloxane units per molecule.

(d) About 100 parts by weight of the dimethylpolysiloxane containing on an average 4 lateral allyloxypropyl groups per molecule and having a viscosity of 330 mm$^2$·s$^{-1}$ at 25° C., the preparation of which is described in (c) above, are mixed with 5 parts by weight of a copolymer which consists of methylhydrogenosiloxane and trimethylsiloxane units and contains, on an average, 25 methylhydrogenosiloxane units per molecule. About 1 part by weight of the mixture of platinum-divinyltetramethyldisiloxane complex and diluent, the preparation of which is described above, is added to the mixture, so that it contains 100 ppm by weight of platinum calculated as the element and based on the weight of the polysiloxane mixture.

The mixture thus obtained is applied in an amount of about 3.8 g/m$^2$, using a glass rod, to glazed glassine paper which weighs 67 g/m$^2$ and also has low absorbency for water. The coating crosslinks after 40 seconds at room temperature (23° C.) to give a tack- and migration-free coating, which is still not abrasion-resistant after a further 60 seconds storage at room temperature (23° C.). FINAT 10 and 11 test values to determine the release value and the residual adhesive power, printed in "Suppliers and Users Technical Manual", June 1980, pages 21 to 24, using commercially available pressure-sensitive 2.5 cm wide adhesive tape "Tesafilm No. 154", "Tesafilm No. 651", "Tesafilm K 7476" and "Tesafilm A 7475" (Beiersdorf AG, Hamburg, Federal Republic of Germany; the "Tesa" part of the above name is a registered trade mark) are shown in Table 8.

TABLE 8

| Adhesive Tape | Release value cN/cm | Residual Adhesive power % |
|---|---|---|
| Tesa 154 | 11.2 | 78 |
| Tesa 651 | 8.4 | |
| Tesa K 7476 | 15.8 | |
| Tesa A 7475 | 38.4 | |

A second glassine paper is coated as described above and hung for 6 seconds in a circulating air oven at 60° C. The surface temperature of the glassine paper is about 43° C. during this period. A tack- and migration-free and abrasion-resistant coating is obtained. The determination of the release value and the residual adhesive power was carried out in accordance with FINAT 10 and 11, as described above. The test values are shown in Table 9.

TABLE 9

| Adhesive Tape | Release value cN/cm | Residual Adhesive power % |
|---|---|---|
| Tesa 154 | 5.7 | 86 |
| Tesa 651 | 6.9 | |
| Tesa K 7476 | 14.5 | |
| Tesa A 7475 | 14.2 | |

EXAMPLE 8

(a) About 20.3 g of the cohydrolyzed product described in Example 7 (b) above are polymerized in the presence of 100 ppm by weight of phosphonitrile chloride at 80° C. under vacuum and then equilibrated with 300 g of the dimethylpolysiloxane containing terminal allyloxypropyldimethylsiloxy groups and having a viscosity of 480 mm$^2$·s$^{-1}$ at 25° C., the preparation of which is described in Example 1 (c) above, with the addition of 100 ppm by weight of phosphonitrile chloride for 4 hours at 120° C. In order to render the phosphonitrile chloride inactive, the reaction mixture is stirred for 16 hours with 6 g of magnesium oxide, the reaction mixture is then filtered and the volatile constituents are then removed by distillation at 100° C. and 5 hPa (abs.). A polymer is obtained which has a viscosity of 400 mm$^2\cdot$s$^{-1}$ at 25° C. and an iodine number of 7.6 and which contains terminal allyloxypropyldimethylsiloxane units, dimethylsiloxane units and, on an average, 2 allyloxypropylmethylsiloxane units per molecule.

(b) About 100 parts by weight of the dimethylpolysiloxane which contains, on an average, 2 terminal and 2 lateral allyloxypropyl groups per molecule and has a viscosity of 400 mm$^2\cdot$s$^{-1}$ at 25° C., the preparation of which is described in (a) above, are mixed with 5 parts by weight of a copolymer which consists of methylhydrogenosiloxane and trimethylsiloxane units and contains, on an average, 25 methylhydrogenosiloxane units per molecule. About 1 part by weight of the mixture of platinum-divinyltetramethyldisiloxane complex and diluent, the preparation of which is described above, is added to the mixture, so that it contains 100 ppm by weight of platinum, calculated as the element and based on the weight of the polysiloxane mixture.

The mixture thus obtained is applied in an amount of about 3.8 g/m$^2$, using a glass rod, to glazed glassine paper which weighs 67 g/m$^2$ and also has low absorbency for water. The coating crosslinks after 40 seconds at room temperature (23° C.) to give a tack- and migration-free coating which is still not abrasion-resistant after storing for an additional 60 seconds at room temperature (23° C.). FINAT 10 and 11 test values to determine the release value and the residual adhesive power, printed in "Suppliers and Users Technical Manual", June 1980, pages 21 to 24, using commercially available pressure-sensitive 2.5 cm wide adhesive tape "Tesafilm No. 154", "Tesafilm No. 651", "Tesafilm K 7476" and "Tesafilm A 7475" (Beiersdorf AG, Hamburg, Federal Republic of Germany; the "Tesa" part of the above name is a registered trade mark) are shown in Table 10.

TABLE 10

| Adhesive Tape | Release value cN/cm | Residual Adhesive power % |
|---|---|---|
| Tesa 154 | 10.6 | 72 |
| Tesa 651 | 7.4 | |
| Tesa K 7476 | 12.2 | |
| Tesa A 7475 | 40.4 | |

A second glassine paper is coated as described above and hung for 6 seconds in a circulating air oven at 60° C. A tack- and migration-free and abrasion-resistant coating is obtained. The determination of the release value and the residual adhesive power is carried out in accordance with FINAT 10 and 11, as described above. The test values are shown in Table 11:

TABLE 11

| Adhesive Tape | Release value cN/cm | Residual Adhesive power % |
|---|---|---|
| Tesa 154 | 5.4 | 80 |
| Tesa 651 | 4.8 | |
| Tesa K 7476 | 8.5 | |
| Tesa A 7475 | 14.6 | |

What is claimed is:

1. A composition which crosslinks to form an adhesive repellent coating containing
   (1) an organopolysiloxane having only one alkenyloxy functional group per silicon atom which corresponds to the Si-bonded radicals Y of the formula

   $$-(CH_2)_2-R^1-(A-R^2)_z-O-R^3-CH=CH_2. \qquad (1)$$

in which A is selected from the group consisting of —O—, —S— and

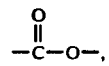

$$-\underset{\underset{\displaystyle O}{\|}}{C}-O-,$$

R$^1$ is a straight-chain or branched alkylene radical having from 1 to 7 carbon atoms per radical or a cycloalkylene radical having from 5 to 7 carbon atoms per radical, R$^2$ is a straight-chain or branched alkylene radical radical having from 2 to 4 carbon atoms per radical, which can be substituted by a hydroxyl group, methoxy group, ethoxy group and trimethylsiloxy group, R$^3$ represents a straaight-chain or branched alkylene radical having from 1 to 7 carbon atom sper radical and z is 0, 1 or 2,
   (2) an organopolysiloxane containing Si-bonded hydrogen atoms, and
   (3) a catalyst which promotes the addition of Si-bonded hydrogen to an aliphatic double bond.

2. The composition of claim 1, which contains (4) an inhibitor.

3. The composition of claim 1 wherein the organopolysiloxane (1) having alkenyloxy functional groups have the general formula

   $$Y_cR_{3-c}SiO(SiR_2O)_n(SiRYO)_mSiR_{3-c}Y_c, \qquad (II)$$

in which R, is selected from the group consisting of a monovalent hydrocarbon radical having from 1 to 18 carbon atoms per radical and a substituted monovalent hydrocarbon radical having from 1 to 18 carbon atoms per radical, Y is a radical of the formula

   $$-(CH_2)_2-R^1-(A-R^2)_z-O-R^3-CH=CH_2. \qquad (I)$$

in which A is selected from the group consisting of —O—, —S— and

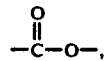

$$-\underset{\underset{\displaystyle O}{\|}}{C}-O-,$$

R$^1$ is a straight-chain or branched alkylene radical having from 1 to 7 carbon atoms per radical or a cycloalkylene radical having from 5 to 7 carbon atoms per radical, R$^2$ is a straight-chain or branched alkylene radical having from 2 to 4 carbon atoms per radical, which can be substituted by a radical selected from the group consisting of a hydroxyl group, methoxy group, ethoxy group and trimethylsiloxy group, R$^3$ is a straight-chain or branched alkylene radical having from 1 to 7 carbon atoms per radical and z is 0, 1 or 2, c is 0 or 1, n is 0 or an integer of from 1 to 1,000 and m is 0 or an integer of from 1 to 100, with the proviso that the organopolysiloxanes contain, on an average, at least 1.5 Si-bonded radicals Y.

4. The composition of claim 2 wherein the organopolysiloxane (1) having alkenyloxy functional groups has the general formula $$Y_c R_{3-c} SiO(SiR_2O)_n (SiRYO)_m SiR_{3-c} Y_c \quad (II)$$

in which R, is selected from the group consisting of a monovalent hydrocarbon radical having from 1 to 18 carbon atoms per radical and a substituted monovalent hydrocarbon radical having from 1 to 18 carbon atoms per radical, Y is a radial of the formula $$-(CH_2)_2-R^1-(A-R^2)_z-O-R^3-CH=CH_2, \quad (I)$$

in which A is selected from the group consisting of —O—, —S— and $$-\overset{\overset{\displaystyle O}{\|}}{C}-O-,$$

$R^1$ is a straight-chain or branched alkylene radical having from 1 to 7 carbon atoms per radical or a cycloalkylene radical having from 5 to 7 carbon atoms per radical, $R^2$ is a straight-chain or branched alkylene radical having from 2 to 4 carbon atoms per radical, which can be substituted by a radical consisting of a hydroxyl group, methoxy group, ethoxy group and trimethylsiloxy group, $R^3$ is a straight-chain or branched alkylene radical having from 1 to 7 carbon atoms per radical and z is 0, 1 or 2, c is 0 or 1, n is 0 or an integer of from 1 to 1,000 and m is 0 or an integer of from 1 to 100, with the proviso that the organopolysiloxanes contain, on an average, at least 1.5 Si-bonded radicals Y.

5. The composition of claim 1, wherein Y is a radical of the formula $$-(CH_2)_3-O-CH_2-CH=CH_2$$

6. The composition of claim 3, wherein Y is a radical of the formula $$-(CH_2)_3-O-CH_2-CH=CH_2$$

7. The composition of claim 1, wherein Y is a radical of the formula $$-(CH_2)_3-O-CH_2-CH_2-O-CH_2-CH=CH_2$$

8. The composition of claim 3, wherein Y is a radical of the formula $$-(CH_2)_3-O-CH_2-CH_2-O-CH_2-CH=CH_2$$

9. A process for preparing coatings which repel sticky substances, which comprises applying a composition containing
  (1) an organopolysiloxane having only one alkenyloxy functional group per silicon atoms which corresponds to the Si-bonded radicals Y of the formula $$-(CH_2)_2-R^1-(A-R^2)_z-O-R^3-CH=CH_2, \quad (I)$$

in which A is selected from the group consisting of —O—, —S— and $$-\overset{\overset{\displaystyle O}{\|}}{C}-O-,$$

$R^1$ is a straight-chain or branched alkylene radical having from 1 to 7 carbon atoms per radical or a cycloalkylene radical having from 5 to 7 carbon atoms per radical, $R^2$ is a straight-chain or branched alkylene radical having from 2 to 4 carbon atoms per radical, which can be substituted by a radical selected from the group consisting of a hydroxyl group, methoxy group, ethoxy group and trimethylsiloxy group, $R^3$ is a straight-chain or branched alkylene radical having from 1 to 7 carbon atoms per radical and z is 0, 1 or 2,
  (2) an organopolysilozane containing Si-bonded hydrogen atoms, and
  (3) a catalyst which promotes the addition of Si-bonded hydrogen to an aliphatic double bond, to a surface to be rendered repellent to sticky substances and thereafter curing the composition.

10. The process of claim 9, wherein the composition contains (4) an inhibitor.

* * * * *